United States Patent
Heap

(10) Patent No.: US 7,988,591 B2
(45) Date of Patent: *Aug. 2, 2011

(54) CONTROL ARCHITECTURE AND METHOD FOR ONE-DIMENSIONAL OPTIMIZATION OF INPUT TORQUE AND MOTOR TORQUE IN FIXED GEAR FOR A HYBRID POWERTRAIN SYSTEM

(75) Inventor: Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 994 days.

This patent is subject to a terminal disclaimer.

(21) Appl. No.: 11/853,092

(22) Filed: Sep. 11, 2007

(65) Prior Publication Data

US 2009/0069148 A1   Mar. 12, 2009

(51) Int. Cl.
*B60W 10/06* (2006.01)
*B60W 10/08* (2006.01)
*B60W 10/10* (2006.01)

(52) U.S. Cl. .......................................... 477/3; 477/902
(58) Field of Classification Search .................. 477/3, 5, 477/902
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 7,641,582 B2 * | 1/2010 | Heap | ................................. 477/3 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |

(Continued)

FOREIGN PATENT DOCUMENTS

CN            1654854 A    8/2005

*Primary Examiner* — Edwin A. Young

(57) ABSTRACT

There is provided a control system for a powertrain system including an electro-mechanical transmission operative in a plurality of fixed gear modes and continuously variable modes. The control system is adapted to identify preferred operating conditions for operating the powertrain in a fixed gear operating range state. The method comprises determining a range of permissible input torques. States for input torque are iteratively selected, and a motor torque output from the first electrical machine is optimized based upon the selected state for the input torque. A motor torque output from the second electrical machine is determined based upon the optimized motor torque output from the first electrical machine. A cost for each of the iteratively selected states for the input torque and the motor torques from the first and second electrical machines is calculated. A preferred operating range is identified based upon the plurality of costs.

20 Claims, 7 Drawing Sheets

U.S. PATENT DOCUMENTS

| | | |
|---|---|---|
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1* | 11/2008 | Snyder ..................... 477/110 |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

* cited by examiner

US 7,988,591 B2

CONTROL ARCHITECTURE AND METHOD FOR ONE-DIMENSIONAL OPTIMIZATION OF INPUT TORQUE AND MOTOR TORQUE IN FIXED GEAR FOR A HYBRID POWERTRAIN SYSTEM

TECHNICAL FIELD

This invention pertains generally to control systems for powertrain control systems employing electro-mechanical transmissions.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions are tasked with implementing control schemes to monitor system states and control operation of various systems and actuators to effectively control powertrain operation. Such a system is described hereinafter.

SUMMARY OF THE INVENTION

In accordance with an embodiment of the invention, a method and an apparatus are provided to control operation of a powertrain system comprising a electro-mechanical torque transmission device operative to transmit torque input from a plurality of torque-generative devices.

The method comprises operating the powertrain to determine a range of permissible input torques from the internal combustion engine to the electro-mechanical transmission. States for input torque from the range of permissible torques are iteratively selected, and a motor torque output from the first electrical machine is optimized based upon the selected state for the input torque. A motor torque output from the second electrical machine is determined based upon the optimized motor torque output from the first electrical machine. A cost for each of the iteratively selected states for the input torque and the motor torques from the first and second electrical machines is calculated. A preferred input torque is identified based upon the plurality of costs.

The invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
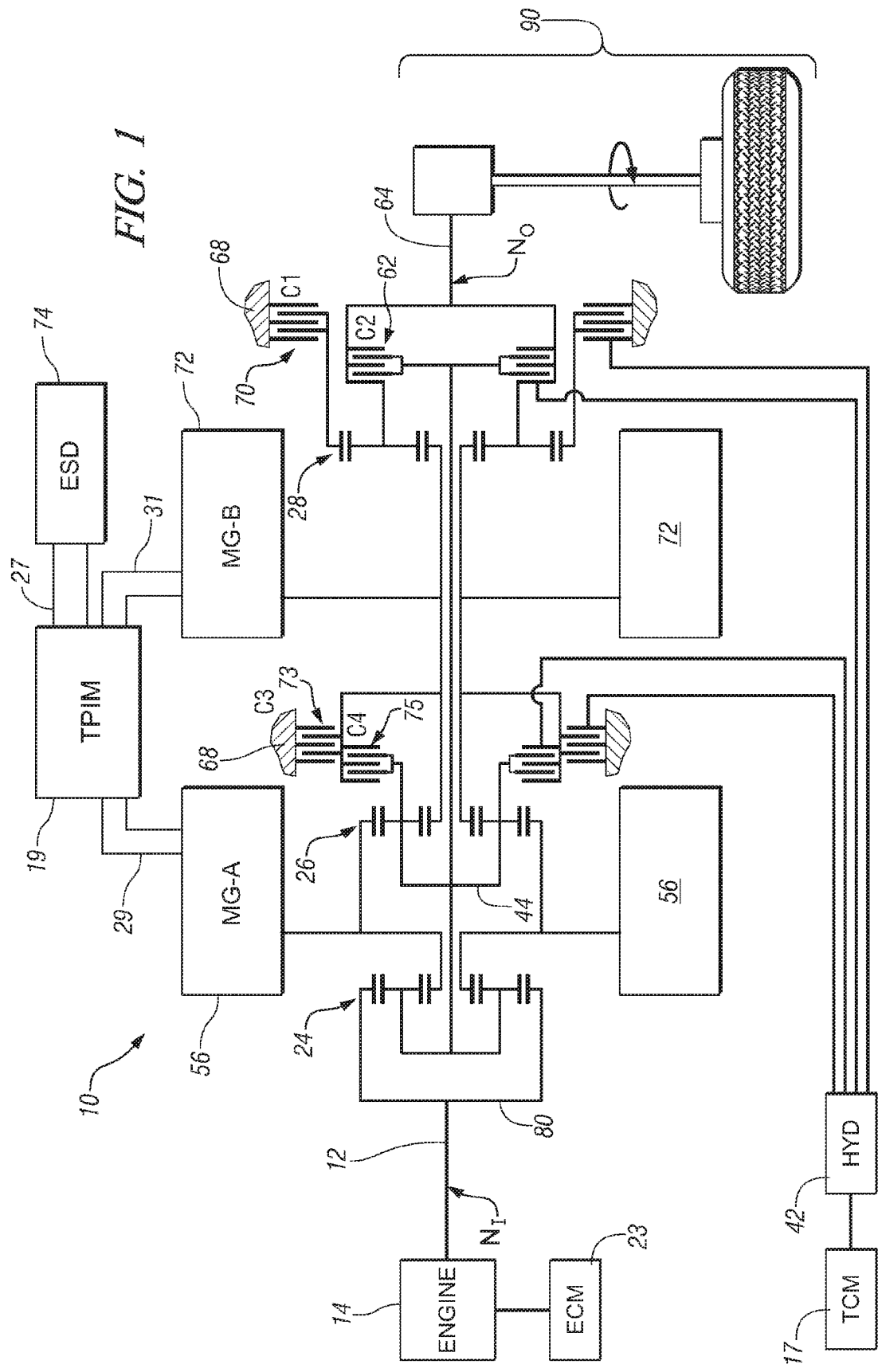
FIG. 1 is a schematic diagram of an exemplary powertrain, in accordance with the present invention.
Figure 2:
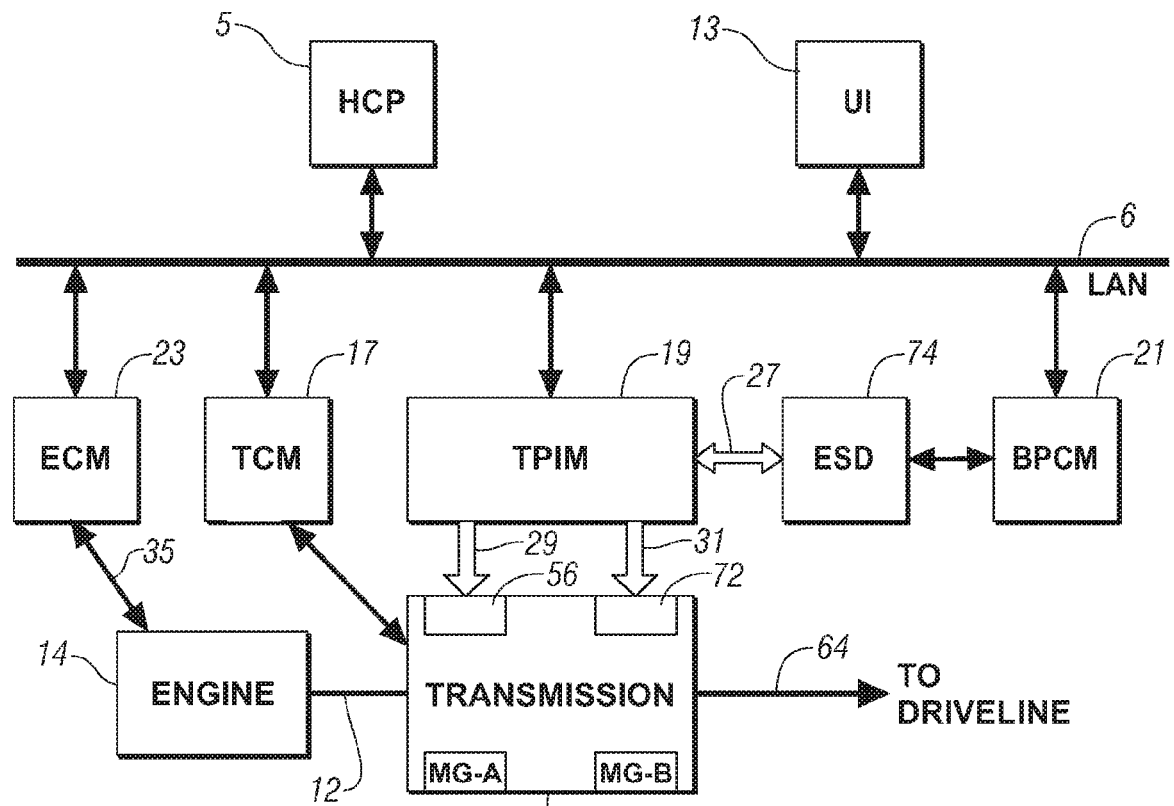
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention. The control scheme described herein comprises a method to determine operating conditions for a powertrain comprising an internal combustion engine and a hybrid transmission selectively operative to transmit torque therebetween. The method comprises determining a torque output and an operating cost for operating the electrical machines of the hybrid transmission effective to meet an operator torque request when the engine is operating in an engine-off operating state, effective to meet the operator torque request. Determining torque output for operating the electrical machines comprises executing a predetermined system equation effective to determine motor torque outputs from each of the electrical machines based upon the selected state value for the input torque and the operator torque request.

Referring now to FIGS. 1 and 2, an exemplary hybrid powertrain system is depicted, comprising an engine 14, transmission 10, control system, and driveline 90 which has been constructed in accordance with an embodiment of the present invention. The exemplary hybrid powertrain system is configured to execute the tactical control scheme for controlling the engine depicted in FIGS. 3-9. Mechanical aspects of the exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$. The engine 14 has a crankshaft having characteristic speed $N_E$ which is operatively connected to the transmission input shaft 12. When a torque converter clutch device (not shown) operatively connects the engine and transmission, the engine speed $N_E$ and output torque $T_E$ can differ from transmission input speed $N_I$ and input torque $T_I$.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module ('TCM') 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

There is first electrical machine comprising a motor/generator 56 ('MG-A'), and a second electrical machine comprising a motor/generator 72 ('MG-B') operatively connected to the transmission via the planetary gears. Transmission output shaft 64 is operably connected to a vehicle driveline 90 to provide motive output torque, $T_O$ to vehicle wheels. Each clutch is preferably hydraulically actuated, receiving pressurized hydraulic fluid from a pump, described below, via an electro-hydraulic control circuit 42.

The transmission 10 receives input torque from the torque-generative devices, including the engine 14 and the MG-A 56 and MG-B 72, and referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor torques $T_A$ and $T_B$ for MG-A and MG-B. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_EST\_N}$) for each of the N clutches C1, C2, C3, and, C4 and transmission output rotational speed $N_O$ of shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power, referred to as a range $P_{BAT\_MIN}$ to $P_{BAT\_MAX}$.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The exemplary two-mode, compound-split, electro-mechanical transmission operates in several fixed gear operating modes and continuously variable operating modes, described with reference to FIG. 1, and Table 1, below.

TABLE 1

| Transmission Operating Range State | Actuated Clutches | |
|---|---|---|
| Mode 1 - Engine Off (M1_Eng_Off) | C1 70 | |
| Mode 1 - Engine On (M1_Eng_On) | C1 70 | |
| Fixed Ratio 1 (GR1) | C1 70 | C4 75 |
| Fixed Ratio 2 (GR2) | C1 70 | C2 62 |
| Mode 2 - Engine Off (M2_Eng_Off) | C2 62 | |
| Mode 2 - Engine On (M2_Eng_On) | C2 62 | |
| Fixed Ratio 3 (GR3) | C2 62 | C4 75 |
| Fixed Ratio 4 (GR4) | C2 62 | C3 73 |

The various transmission operating range states described in the table indicate which of the specific clutches C1, C2, C3, and C4 are engaged or actuated for each of the operating range states. A first mode, i.e., Mode 1, is selected when clutch C1 70 is actuated in order to "ground" the outer gear member of the third planetary gear set 28. The engine 14 can be either on or off. A second mode, i.e., Mode 2, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating, typically as a result of the engine being decoupled from the transmission. Other factors outside the scope of the invention affect when the electrical machines 56, 72 operate as motors and generators, and are not discussed herein.

The control system, shown primarily in FIG. 2, is operable to provide a range of transmission output speeds at shaft 64 from relatively slow to relatively fast within each operating range state. The combination of two modes with a slow-to-fast output speed range in each range state allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e., either clutch C1 62 or C2 70, and by the controlled speed and torque of the electrical machines 56 and 72, which can be referred to as a continuously variable transmission mode. Certain ranges of operation are described below in which fixed gear ratios are achieved by applying an additional clutch. This additional clutch may be clutch C3 73 or C4 75, as shown in the table, above.

When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Figure 3:
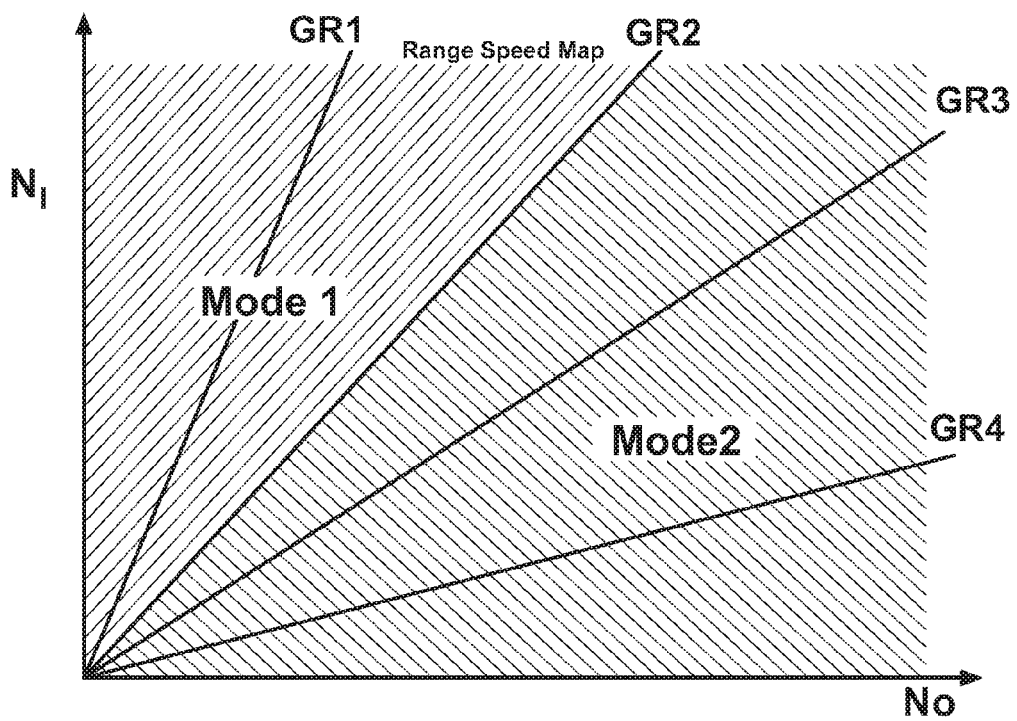
FIG. 3 is a graphical depiction, in accordance with the present invention.

Referring now to FIG. 3, various transmission operating modes are plotted as a function of transmission output speed, $N_O$, and transmission input speed, $N_I$, for the exemplary powertrain control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode 1 and Mode 2. The transmission operating range state is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the operating range state of the transmission depends primarily on the operator torque request $T_{O\_REQ}$ and the ability of the powertrain to meet that output torque request.

Referring to Table 1 and again to FIG. 3, the low range operating state includes selective actuation of clutches C2, C1, and C4, facilitating operation in any one of continuously variable Mode 1, and fixed gears GR1, and GR2. The high range operating state includes selective actuation of clutches C2, C3, and C4, facilitating operation in any one of continuously variable Mode 2 and fixed gears GR3 and GR4. The ranges of continuously variable operation for Mode 1 and Mode 2 can overlap.

In response to an operator's action, as captured by the UI 13, the supervisory HCP control module 5 and one or more of the other control modules determine the operator torque request $T_{O\_REQ}$, to be executed at shaft 64. Final vehicle acceleration is affected by other factors, including, e.g., road load, road grade, and vehicle mass. The operating mode is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

Figure 4:
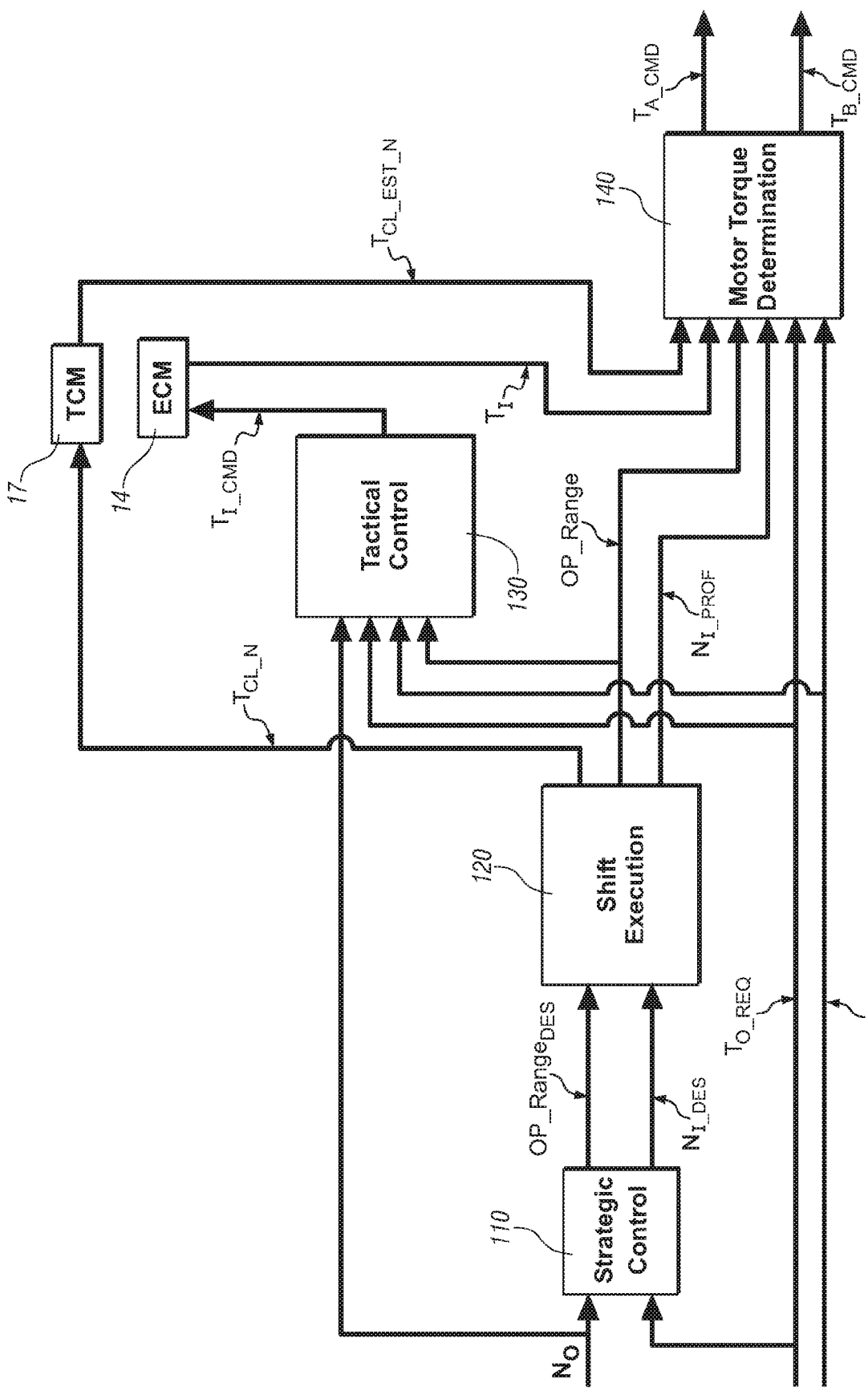
FIGS. 4-9 are schematic flowcharts, in accordance with the present invention.

Referring now to FIGS. 4-9, controlling operation of a hybrid powertrain is described, with reference to the exemplary powertrain described in FIGS. 1, 2, and 3. Referring specifically to FIG. 4, the method and system described herein comprise an aspect of strategic control optimization (Block 110), wherein a preferred or desired operating range state (Op_Range$_{DES}$) is selected based primarily upon output speed, N$_O$ of shaft 64 and the operator torque request, T$_{O\_REQ}$. Output of the strategic control includes the preferred or desired operating range state ('Op_Range$_{DES}$') and desired input speed ('N$_{I\_DES}$') each which are input to a shift execution control block 120. Other aspects of the overall architecture for strategic optimization and control of the exemplary powertrain are described in co-pending U.S. patent application Ser. No. 11/561,140, entitled CONTROL ARCHITECTURE FOR OPTIMIZATION AND CONTROL OF A HYBRID POWERTRAIN SYSTEM which is incorporated by reference, and need not be described herein. Further details can be found in commonly assigned, co-pending U.S. patent application Ser. No. 11/561,156, entitled CONTROL ARCHITECTURE FOR SELECTION OF OPTIMAL MODE OR GEAR AND INPUT SPEED FOR A HYBRID POWERTRAIN SYSTEM, which is incorporated herein by reference in its entirety. The method comprises the following steps, executed as one or more algorithms in the control modules of the distributed control module architecture. The method includes monitoring output of the transmission, typically N$_o$, the operator torque request, T$_{O\_REQ}$, at shaft 64, and, the available battery power P$_{BAT\_MIN}$ and P$_{BAT\_MAX}$. At least one allowable operating range state, described with reference to Table 1, is identified. A torque range for each of the allowable range states is determined. A cost for operating in each of the determined torque ranges is calculated, and one of the determined torque ranges is selected as a preferred operating range state based upon the calculated costs for each determined torque range. The powertrain is controlled to the preferred operating range state thereafter.

Figure 5:
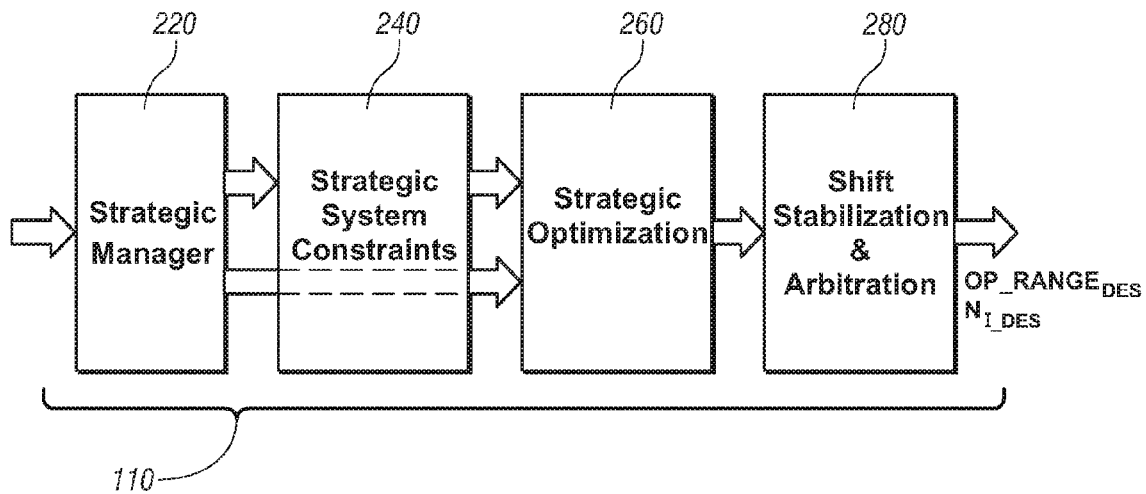

Referring now to FIG. 5, a functional block diagram details the strategic control block 110 of FIG. 4, and depicts inputs N$_O$ and T$_{O\_REQ}$ to a strategic manager segment 220, which has outputs to a system constraint segment 240 and an optimization segment 260. The output of the system constraint segment 240 is input to the optimization segment 260. The outputs of the optimization segment 260 are input to the shift stabilization and arbitration segment 280, which has an output comprising the preferred operating range state, OP_Range$_{DES}$ and desired input speed, N$_{I\_DES}$.

Figure 6:
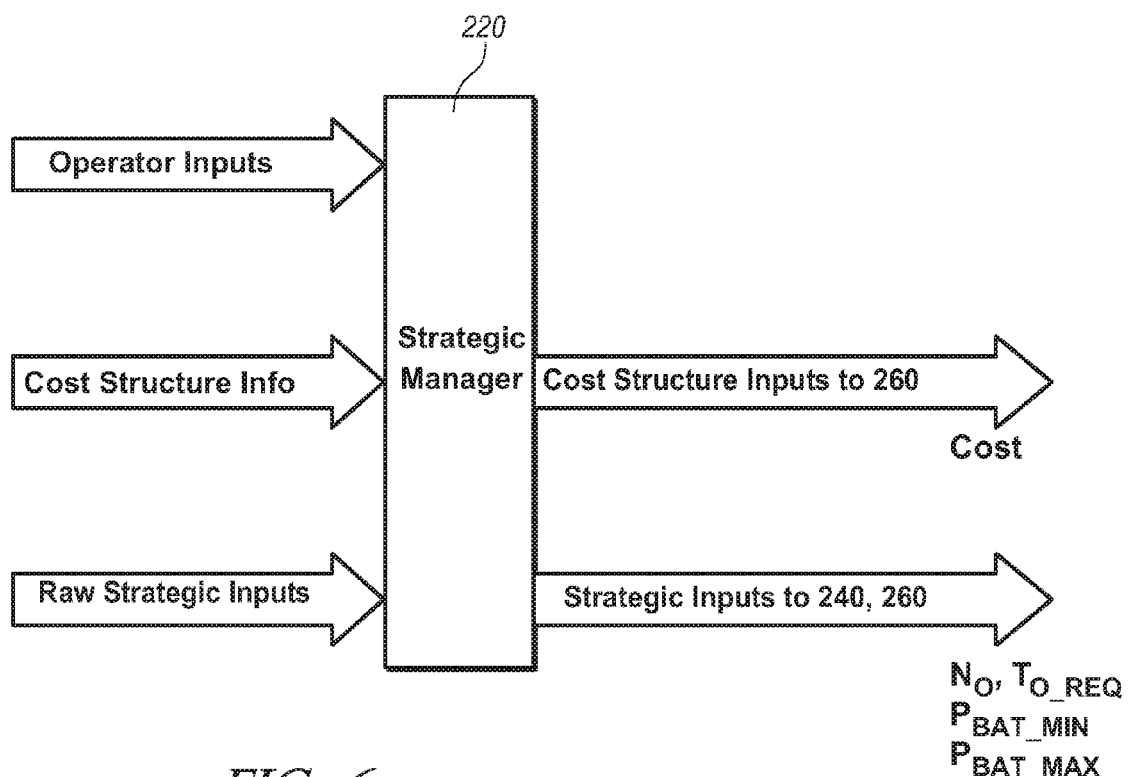

Referring now to FIG. 6, the strategic manager segment 220 includes operator inputs, typically torque requests and other inputs through the UI 13, cost structure information, described hereinbelow, and raw strategic inputs, comprising raw signals related to the hybrid powertrain operating conditions, including those related to the ESD 74. Outputs from the strategic manager segment 220 comprise cost structure information (COST), strategic inputs including transmission output speed N$_O$, range of available battery power P$_{BAT\_MIN}$ and P$_{BAT\_MAX}$, and the operator torque request T$_{O\_REQ}$.

Figure 7:
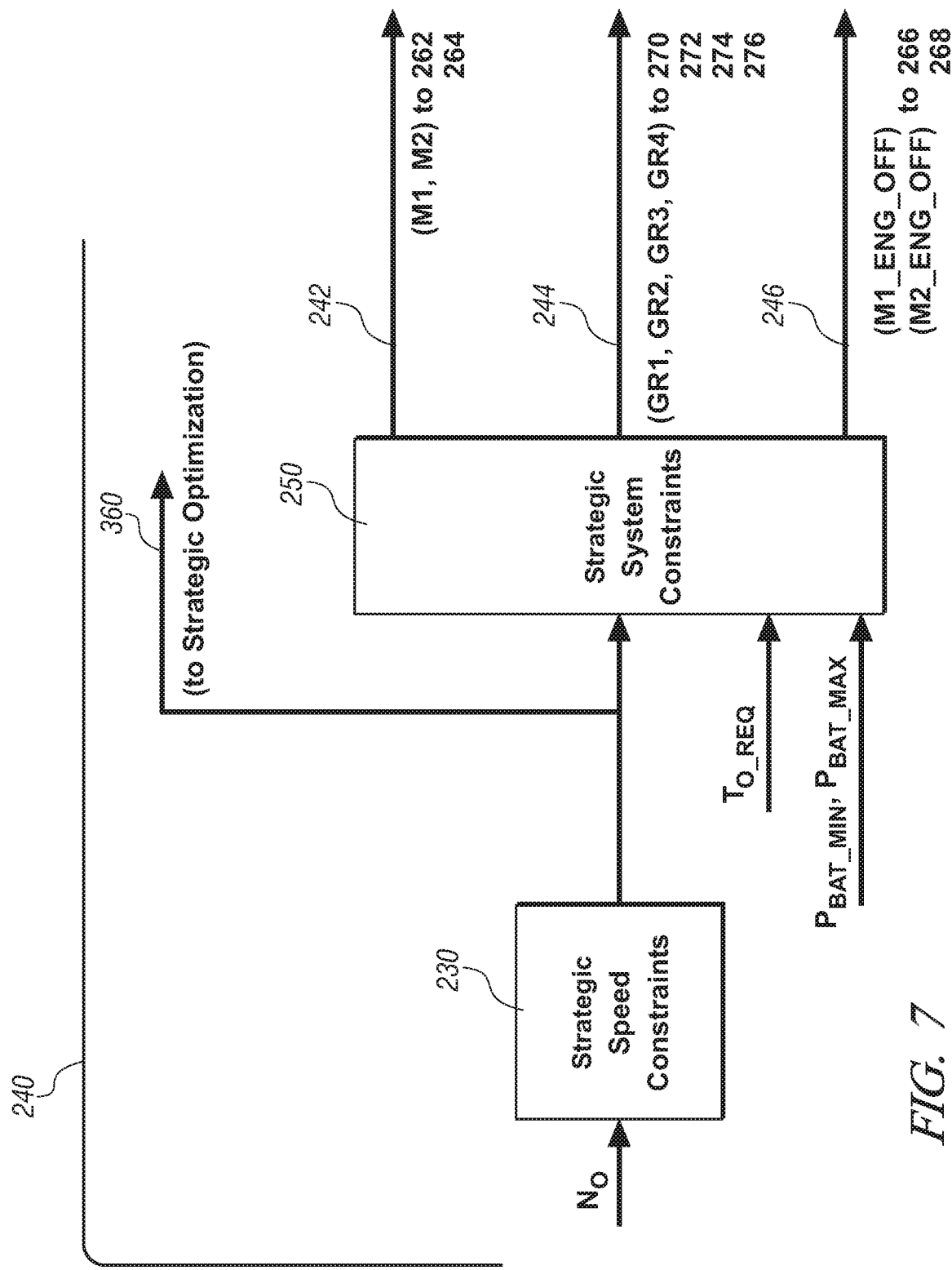

Referring now to FIG. 7, a detailed description of the strategic system constraints segment 240 is now described. The output speed N$_O$ is input to strategic speed constraint segment 230. The speed constraint segment 230 determines minimum and maximum input speeds for operating in each continuously variable mode, i.e., N$_{I\_MIN}$_M1, N$_{I\_MAX}$_M1, N$_{I\_MIN}$_M2, and N$_{I\_MAX}$_M2. The minimum and maximum input speeds, the available battery power P$_{BAT\_MIN}$ and P$_{BAT\_MAX}$, and the operator torque request T$_{O\_REQ}$ are output to strategic system constraints segment 250 which determines the inputs to the strategic optimization segment 260 for each of the hybrid operating range states, i.e., GR1, GR2, GR3, GR4, M1_Eng_Off, M1_Eng_On, M2_Eng_Off, and M2_Eng_On, based upon current operating constraints, specifically output speed N$_O$. There are three output paths 242, 244, 246 from segment 250 which supply inputs to optimization segment 260. In this invention, output path 244 provides relevant system constraint information, comprising a range of torque values in form of minimum and maximum input torques (T$_{I\_MIN}$, T$_{I\_MAX}$) for each of the fixed gear operations, i.e., GR1, GR2, GR3, and, GR4. This information is communicated to each of segments 270, 272, 274, and 276 of segment 260.

Figure 8:
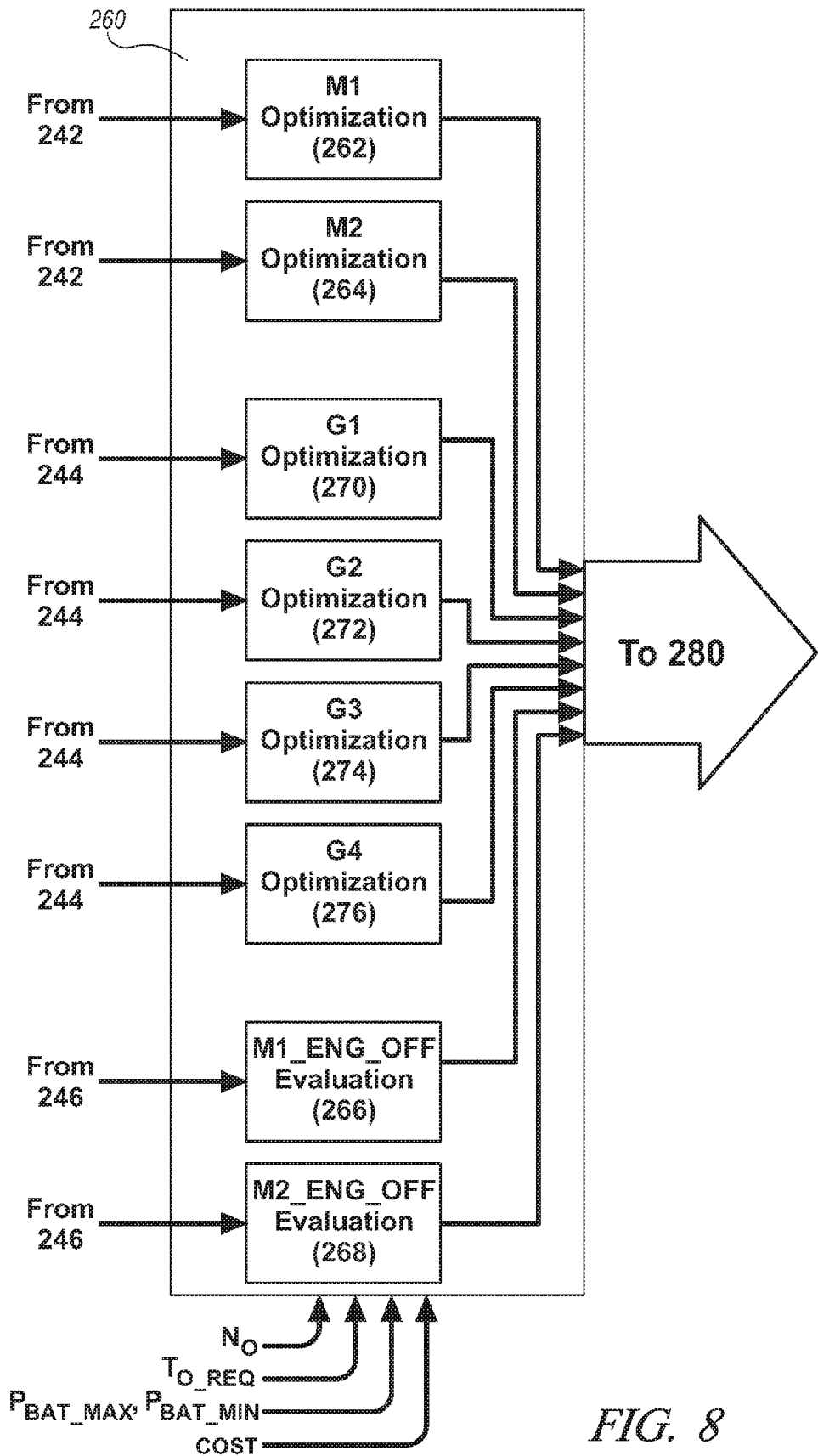

Referring now to FIG. 8, the strategic optimization segment 260 is now described. The allowable hybrid operating range states output from segment 240 to the strategic optimization segment 260 are used to identify which of the optimization segments 270, 272, 274 and 276 are to be executed. Segments 262, 264, 270, 272, 274 and 276 comprise optimization segments and segments 266 and 268 comprise evaluation segments, wherein an optimum operating cost (P$_{COST}$) is determined for each of the permissible operating range states, based upon the inputs previously described, including the previously described range of torque values and costs related to driveability, fuel economy, emissions, and battery life. The optimum operating cost preferably comprises a minimum operating cost at a powertrain operating point within the range of attainable torque or speed values for each operating range state.

Figure 9:
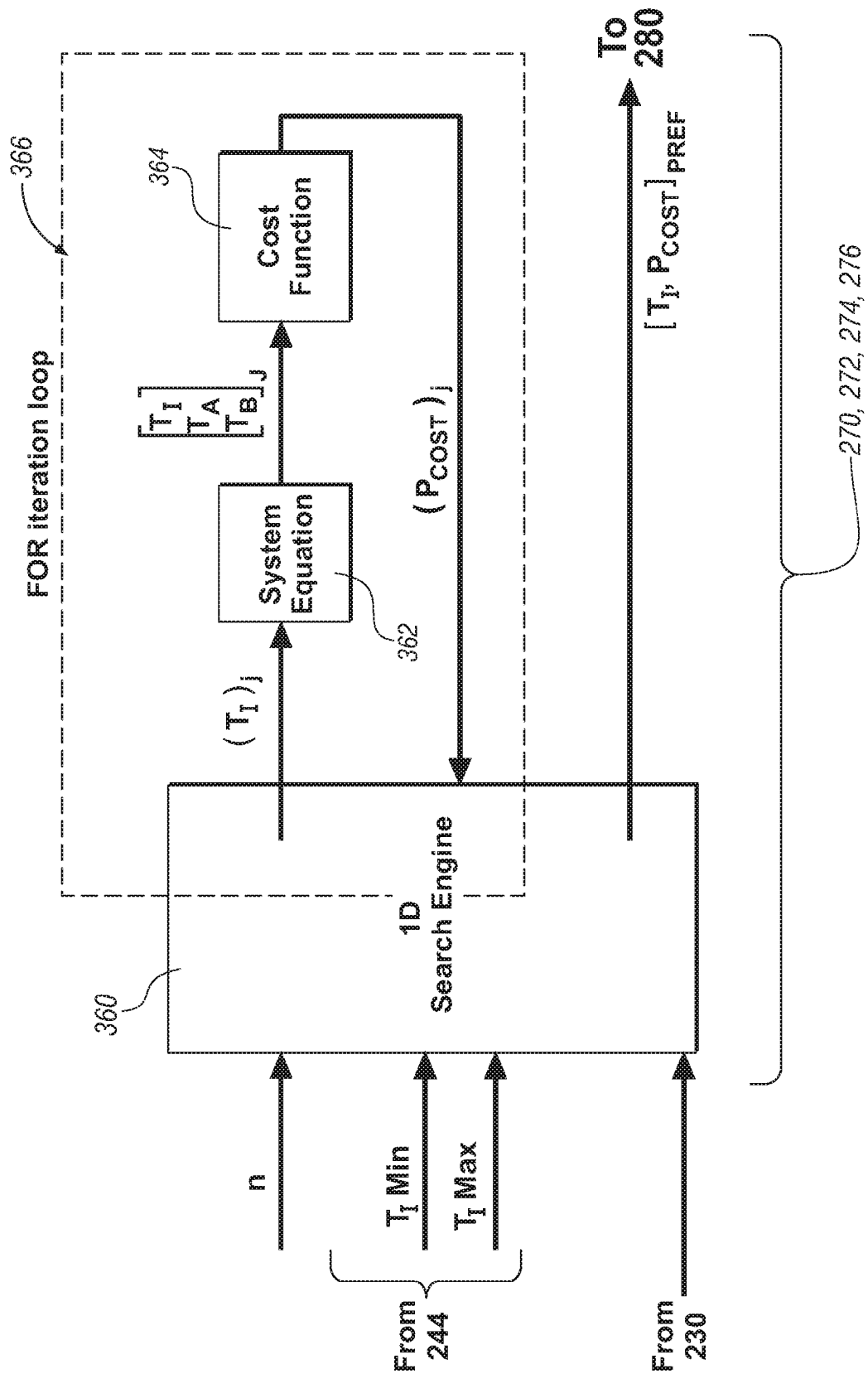

Referring now to FIG. 9, a method to determine preferred operating conditions for operating the exemplary powertrain in fixed gear mode operating range state, i.e., any one of GR1, GR2, GR3, and GR4, is described. The range of permissible input torque values to the transmission, comprising minimum and maximum input torques T$_{I\_MIN}$ and, T$_{I\_MAX}$ are input from segment 244 to segment 360 for each of blocks 270, 272, 274, and 276. Block 360 comprises a one-dimensional search engine ("1D Search Engine"), which iteratively generates state values for input torque, [T$_I$]$_j$ within the range of permissible input torques, for execution in an iterative loop 366. The subscript "j" refers to a specific iteration, and ranges in value from l to n. The quantity of iterations, n, can be generated by any one of a number of methods, either internal to the search engine, or as a part of the overall method.

The state value for input torque, [T$_I$]$_j$ is input to a system equation 362 comprising a one-dimensional optimization equation from which an optimum state value for motor torque $T_A$ is determined. A state value for motor torque $T_B$ is determined based upon the determined optimum state value for motor torque $T_A$. The motor torques $T_A$ and $T_B$ and input torque $T_I$ are input to a cost function 364, which calculates a cost $(P_{COST})_j$ for operating the exemplary powertrain to achieve the specific input torques. The cost determined each iteration is returned and captured, or analyzed, in the search engine 360 depending upon specifics of the search engine 360. The search engine 360 iteratively calculates values for the cost $(P_{COST})_j$ and identifies a preferred cost, which comprises a minimum cost for all the iteratively calculated values in this embodiment. The preferred cost and corresponding value for input torque $[T_I, P_{COST}]_{PREF}$ are output to block 280 from each of blocks 270, 272, 274, and 276, and comprise a preferred cost for each of the fixed gear ratios.

The method includes determining the range of permissible input torques $T_{I\_MIN}$ to $T_{I\_MAX}$. The permissible input torques comprise practical constraints associated with the specific engine embodiment, and are based upon operating characteristics of the specific engine used, with limits related to combustion stability and fuel cutoff. The permissible transmission input torques and the "n" quantity of iterations are preferably input through line 244 for each of the gears GR1, GR2, GR3, GR4 to segment 360, which comprises an element of each of segments 270, 272, 274, 276, and comprise an output from segment 240, described above.

The range of permissible input torques $T_{I\_MIN}$ and $T_{I\_MAX}$ comprise boundary conditions that are input to the one-dimensional search engine 360 including iterative search loop 366. The one-dimensional search engine comprises any one of several known methods executed as an algorithm in one of the control modules which is operative to generate state values for $T_I$ within the ranges of permissible values, output the state values $[T_I]_j$ to the iteration loop 366 to determine a correlated cost, $(P_{COST})_j$, and evaluate the resultant, i.e., $[T_I, P_{COST}]_j$ in the search engine 360. The search engine determines a preferred resultant, i.e., $[T_I, P_{COST}]_{PREF}$, by comparing the resultant from each iteration with a previously determined resultant. When the preferred resultant comprises a minimum value for the correlated cost, the engine 360 selects and captures and stores the lesser value of the resultant and the previously determined resultant. When the search engine has executed the search over the range of state values for $T_I$, the final captured resultant comprises the preferred resultant, $[T_I, P_{COST}]P_{REF}$, which is then output to block 280.

The one-dimensional search engine 360 can comprise any one of several known search engines operative to iteratively generate a value for $T_I$ within the ranges of permissible values therefor. By way of example, one such search engine iteratively generates inputs over the entire range of permissible input torques $T_{I\_MIN}$ to $T_{I\_MAX}$. By way of example, another search engine comprises a heuristic sampling search process wherein a state value for $T_I$ is determined for input to the system equation (Block 362), based upon previously determined state values for $T_I$ and $P_{COST}$. The one-dimensional search method solves optimization problems looking for the value of the objective function, i.e., the output of the cost equation, to be lower than the value at the current point. Regardless of the search engine utilized, it resides as an algorithm in one of the control modules for execution during ongoing operation of the vehicle.

Each state value for input torque, $(T_I)_j$ is input to system equation block 362, from which state values for motor torques $T_A$ and $T_B$ are determined. The torque relationship between MG-A and MG-B is as defined in Eqs 1 and 2, below:

$$T_B = [d_{11} \ d_{12} \ d_{13} \ d_{14}] * \begin{bmatrix} T_I \\ T_A \\ T_O \\ N_I^{\cdot} \end{bmatrix} \quad [1]$$

$$T_A = [g_{11} \ g_{12} \ g_{13} \ g_{14}] * \begin{bmatrix} T_I \\ T_B \\ T_O \\ N_I^{\cdot} \end{bmatrix} \quad [2]$$

wherein $T_I$ is the input torque originating from engine 14, $T_O$ is the transmission output torque, i.e., the requested output torque, $T_{O\_REQ}$, $T_A$ and $T_B$ are the operating torques for MG-A 56 and MG-B 72, $N_I^{\cdot}$ represents time-rate change in transmission input speed $N_I$, and $d_{11}$, $d_{12}$, $d_{13}$, $d_{14}$, and $g_{11}$, $g_{12}$, $g_{13}$, $g_{14}$ are known scalar values determined for each of the fixed gears of the specific application. In this application, when the transmission output torque $T_O$ is known, there are two degrees of freedom, i.e., $T_I$ and $T_A$, by which $T_B$ can be optimized and determined, or $T_I$ and $T_B$, by which $T_A$ can be optimized and determined, depending upon the fixed gear operating range state.

The system equation (Block 362) operates in two parts to determine a preferred or optimum value for $T_I$. In the first part, an optimum value for $T_A$ is determined for each iterated value for $T_I$, or over the range of permissible input torques $T_{I\_MIN}$ and $T_{I\_MAX}$, and is based upon minimization of the battery power, $P_{BAT}$, to operate the electrical motors MG-A and MG-B, which can comprise a predetermined calibration or a one-dimensional optimization search. Torque $T_B$ is calculated based upon the optimized $T_A$ using one of Eq. 1 and Eq. 2, above. Thus the system reduces to a single degree of freedom i.e., $T_I$, by which $T_A$ can be optimized and $T_B$ can be determined, or by which $T_B$ can be optimized and $T_A$ can be determined.

The selected state values for $T_I$ and the optimized value for $T_A$ and the calculated state value for motor torque $T_B$ are all input to the cost equation (Block 364) to calculate a cost, $P_{COST}$, which is associated with the selected state values for $T_I$. The input torque and cost $[T_I, P_{COST}]_j$ are input back through the search loop to segment 360, which iteratively executes the one-dimensional search method over the range of permissible input torques $T_I$ to converge on a preferred or optimal value for cost, $P_{COST}$. The optimal value for cost, $P_{COST}$ is preferably a minimum cost value.

The cost information used in the cost function 364 preferably comprises operating costs which are generally determined based upon factors related to vehicle driveability, fuel economy, emissions, and battery life for the determined torque range. Furthermore, costs in this invention are assigned and associated with only electrical power consumption associated with a specific operating point of the powertrain system for the vehicle. Lower operating costs are generally associated with lower battery power usage, and lower emissions for an operating point, and take into account a current operating range state of the powertrain system. The optimum operating cost $(P_{COST})$ can be determined by calculating a total powertrain system loss, comprising an overall system power loss and a cost penalty, such as can be associated with controlling battery state of charge. The overall system power loss comprises a term based upon losses in the electrical system (e.g. wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery. Operating costs are preferably developed relative to specific powertrain/vehicle applications during vehicle calibration pre-production. An exemplary method for determining engine power losses are described in commonly assigned U.S. Patent Application Publication Number 2005/0256633 A2, entitled COST STRUCTURE METHOD INCLUDING FUEL ECONOMY AND ENGINE EMISSION CONSIDERATIONS, the contents of which are incorporated herein by reference.

The preferred operating range is thus identified based upon the costs, including the preferred input torque which expends a minimum cost. Ranges of permissible motor torques from MA and MB can be determined based upon the range of permissible input torques, based upon available battery power. This leads to determining a preferred fixed gear operating range state based upon the preferred input torque.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for operating a powertrain comprising an internal combustion engine and first and second electrical machines and an electro-mechanical transmission selectively operative to transmit torque therebetween, the method comprising:
   determining a range of permissible input torques from the internal combustion engine to the electro-mechanical transmission;
   iteratively selecting states for input torque from the range of permissible torques;
   optimizing a motor torque output from the first electrical machine based upon the selected state for the input torque;
   determining a motor torque output from the second electrical machine based upon the optimized motor torque output from the first electrical machine;
   calculating a cost for each of the iteratively selected states for the input torque and the motor torques from the first and second electrical machines; and,
   identifying a preferred input torque based upon the plurality of costs.

2. The method of claim 1, wherein identifying the preferred input torque based upon the plurality of costs comprises identifying a state value for input torque which expends a minimum cost.

3. The method of claim 1, further comprising determining ranges of permissible motor torques from each of the first and second electrical machines based upon the range of permissible input torques.

4. The method of claim 3, wherein the ranges of permissible motor torques from each of the first and second electrical machines are determined based upon available battery power.

5. The method of claim 1, wherein the range of permissible input torques is determined based upon an output speed of the transmission and an operator torque request.

6. The method of claim 1, further comprising determining a preferred operating range state based upon the preferred input torque.

7. The method of claim 1, wherein iteratively selecting state values for the input torque comprises: executing a one-dimensional search engine to generate state values for the input torque within the range of permissible input torques.

8. The method of claim 1, wherein each cost is calculated based upon engine fuel consumption and an electrical battery power cost associated with the input torque and the motor torques for the first and second electrical machines.

9. The method of claim 1, further comprising operating the electro-mechanical transmission of the powertrain in a fixed gear operating range state.

10. The method of claim 9, further comprising identifying a preferred fixed gear operating range state based upon the plurality of costs.

11. The method of claim 1, wherein optimizing the motor torque output from the first electrical machine based upon the selected state for the input torque comprises selecting the motor torque output from the first electrical machine based upon the selected state for the input torque to minimize battery power to operate the first and second electrical machines.

12. Method to identify preferred operating conditions for operating a powertrain in a fixed gear operating range state the powertrain comprising an internal combustion engine and first and second electrical machines and an electro-mechanical transmission selectively operative to transmit torque therebetween, the method comprising:
   determining a range of permissible input torques;
   determining a plurality of costs, each cost based upon a selected permissible input torque; and,
   identifying a preferred input torque based upon the plurality of costs.

13. The method of claim 12, further comprising identifying the preferred operating conditions for operating the powertrain in the fixed gear operating range state to substantially meet an operator torque request.

14. The method of claim 12, wherein determining the plurality of costs, each cost based upon a selected permissible input torque further comprises:
   iteratively selecting state values for input torque from the range of permissible input torques;
   determining an optimum motor torque from the first electrical machine based upon each of the selected state values for the input torque;
   determining a motor torque from the second electrical machine based upon the selected state value for the input torque and the optimum motor torque from the first electrical machine; and,
   determining a cost for each iteratively selected state value for the input torque, the optimum motor torque from the first electrical machine, and, the motor torque from the second electrical machine determined therefrom.

15. The method of claim 14, wherein iteratively selecting state values for the input torque comprises: executing a one-dimensional search engine to generate the state values for the input torque across the range of permissible input torques.

16. The method of claim 14, wherein determining the motor torque from the second electrical machine comprises executing a system equation based upon the selected state value for the input torque and the selected state value for the optimum motor torque from the first electrical machine.

17. The method of claim 14, further comprising determining the optimum motor torque from the first electrical machine based upon each of the selected state values for the input torque to minimize battery power to operate the first and second electrical machines.

18. Apparatus, comprising:
   a distributed control module architecture comprising: a plurality of control modules operatively connected to a powertrain comprising an internal combustion engine and first and second electrical machines and an electro-mechanical transmission selectively operative to transmit torque therebetween the transmission selectively operative in one of a plurality of fixed gear operating range states through selective actuation of a plurality of torque-transfer clutches; the control modules adapted to execute a plurality of algorithms contained therein to effect the following steps, the algorithms comprising:

code to determine a range of permissible input torques from the internal combustion engine to the electro-mechanical transmission;

code to iteratively select states for input torque from the range of permissible torques;

code to optimize a motor torque output from the first electrical machine based upon the selected state for the input torque;

code to determine a motor torque output from the second electrical machine based upon the optimized motor torque output from the first electrical machine;

code to calculate a cost for each of the iteratively selected states for the input torque and the motor torques from the first and second electrical machines;

code to identify a preferred input torque based upon the plurality of costs; and, code to select a preferred fixed gear operating range state.

19. The apparatus of claim 18, wherein code to optimize the motor torque output from the first electrical machine based upon the selected state for the input torque comprises code to select the motor torque output from the first electrical machine based upon the selected state for the input torque to minimize battery power to operate the first and second electrical machines.

20. The apparatus of claim 18, wherein the code to iteratively select state values for the input torque comprises: code to execute a one-dimensional search engine to generate state values for the input torque within the range of permissible input torques.

* * * * *